United States Patent
Aiba

(10) Patent No.: US 9,329,811 B2
(45) Date of Patent: May 3, 2016

(54) IMAGE FORMING APPARATUS THAT RECEIVES INFORMATION REQUESTING DATA AND TRANSMITS RESPONSE DATA, A RESPONSE METHOD, AND A COMPUTER READABLE RECORDING MEDIUM

(71) Applicant: Kyocera Document Solutions Inc., Osaka (JP)

(72) Inventor: Masaaki Aiba, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/579,140

(22) Filed: Dec. 22, 2014

(65) Prior Publication Data

US 2015/0186079 A1  Jul. 2, 2015

(30) Foreign Application Priority Data

Dec. 27, 2013 (JP) ................... 2013-272654

(51) Int. Cl.
*G06F 3/12* (2006.01)
*G06K 15/00* (2006.01)

(52) U.S. Cl.
CPC ............ *G06F 3/1221* (2013.01); *G06F 3/1236* (2013.01); *G06F 3/1285* (2013.01); *G06K 15/402* (2013.01); *G06K 15/4055* (2013.01); *Y02B 60/1271* (2013.01)

(58) Field of Classification Search
None
See application file for complete search history.

(56) References Cited

U.S. PATENT DOCUMENTS

2009/0119522 A1* 5/2009 Satoh ........................... 713/320
2014/0146345 A1* 5/2014 Fujisawa ..................... 358/1.14

FOREIGN PATENT DOCUMENTS

JP          2010094925          4/2010

OTHER PUBLICATIONS

JP 2010094925 A; Kawamata, Ryota; Japan; Apr. 2010.*

* cited by examiner

*Primary Examiner* — Marivelisse Santiago Cordero
*Assistant Examiner* — Neil R McLean
(74) *Attorney, Agent, or Firm* — K&L Gates LLP

(57) ABSTRACT

In an image forming apparatus connected to a network, an interface unit receives information requesting data via the network and transmits response data to the network during a normal mode and a standby mode. A storage unit stores the response data being read out during the standby mode. A normal-mode response data generating unit generates the response data during the normal mode. An information storing unit, during the normal mode, stores, in the storage unit, information about the response data. A standby-mode response data generating unit, during the standby mode, generates the response data from the information about the response data, and stores a response frequency of the information. A stored response data deleting unit deletes, if an amount of the information exceeds a storage capacity of the storage unit, the information with the response frequency that is lower than a specified threshold.

6 Claims, 11 Drawing Sheets

Fig. 3A

| ITEM | DATA |
|---|---|
| Ethernet Address | 00:00:EE:AE:AB:C8 |
| IP Address | 192.168.0.123 |

| OID | DATA | | | Frequency of Response |
|---|---|---|---|---|
| | Type | Data Value | Last Response Time | |
| 1.3.6.1.2.1.2.2.1.1.1 | INTEGER | 1 | 2013/12/01 21:22:50 | 5 |
| 1.3.6.1.2.1.2.2.1.2.1 | STRING | eth0 | 2013/12/30 00:01:01 | 20 |
| 1.3.6.1.2.1.2.2.1.3.1 | INTEGER | 6 | 2013/12/01 21:22:52 | 2 |
| 1.3.6.1.2.1.2.2.1.4.1 | INTEGER | 1500 | 2013/05/10 06:50:50 | 1 |
| 1.3.6.1.2.1.2.2.1.5.1 | Gauge32 | 0 | 2012/01/01 12:12:00 | 0 |
| 1.3.6.1.2.1.2.2.1.6.1 | Hex-STRING | 00 00 EE AE AB C8 | 2013/12/30 00:01:02 | 3 |
| ... | ... | ... | ... | ... |

| OID |
|---|
| 1.3.6.1.2.1.2.2.1.6.1 |
| ... |

# IMAGE FORMING APPARATUS THAT RECEIVES INFORMATION REQUESTING DATA AND TRANSMITS RESPONSE DATA, A RESPONSE METHOD, AND A COMPUTER READABLE RECORDING MEDIUM

INCORPORATION BY REFERENCE

This application is based on, and claims priority to corresponding Japanese Patent Application No. 2013-272654, filed in the Japan Patent Office on Dec. 27, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure relates to an image forming apparatus, a response method, and a non-transitory computer readable recording medium.

BACKGROUND

There is a typical image forming apparatuses such as a multi-functional peripheral (MFP) that prints documents and images.

To save energy in the typical image forming apparatus, if a preset time elapses while the user is not using the image forming apparatus, the power supply to units that largely consume electric power is stopped and the image forming apparatus enters a standby state in which electric power is supplied only to some functions to reduce power consumption (the standby state will be referred to below as the standby mode).

Once the image forming apparatus enters the standby mode, however, it takes time for the image forming apparatus to return to a state in which the user may use the image forming apparatus (the state will be referred to below as the normal mode).

If, for example, a host computer transmits information requesting data to an image forming apparatus placed in the standby mode via a network to check information about the image forming apparatus, the image forming apparatus shifts from the standby mode to the normal mode before transmitting response data. If the host computer transmits information requesting data many times, the number of shifts from the standby mode to the normal mode is increased and the time during which the image forming apparatus is placed in the standby mode is shortened. This prevents power consumption from being efficiently reduced.

To deal with the above-description, it is known to provide an image forming apparatus that has a controller including, for example, two central processing units (CPUs), one of which is a main CPU that responds in the normal mode and the other of which is a sub-CPU that responds in the standby mode, the main CPU stores response data in a random-access memory (RAM) in the main CPU.

When the known image forming apparatus shifts to the standby mode, the sub-CPU retrieves preset response data from the RAM in the main CPU and stores the response data in a RAM in the sub-CPU. When the image forming apparatus shifts from the normal mode to the standby mode, part of response data is stored in the RAM in the sub-CPU. In the standby mode, the sub-CPU may generate response data from data stored in the RAM of the sub-CPU and may transmit the response data.

Each time the known image forming apparatus shifts to the standby mode, however, data in the RAM in the main CPU needs to be transferred to the RAM in the sub-CPU. This takes time to shift until the image forming apparatus enters the standby mode.

SUMMARY

The present disclosure relates to an image forming apparatus that receives information requesting data and transmits response data, a response method, and a non-transitory computer readable recording medium.

An image forming apparatus connected to a network includes an interface unit, a storage unit, a normal-mode response data generating unit, an information storing unit, a standby-mode response data generating unit, and an stored response data deleting unit.

The interface unit receives information requesting data via the network and transmits response data to the network in response to the information requesting data during a normal mode and a standby mode.

The storage unit stores the response data being read out during the standby mode.

The normal-mode response data generating unit generates the response data during the normal mode.

The information storing unit, during the normal mode, stores, in the storage unit, information about the response data generated by the normal-mode response data generating unit.

The standby-mode response data generating unit, during the standby mode, generates the response data from the information about the response data, and stores a response frequency of the information about the response data.

The stored response data deleting unit deletes, if an amount of the information about the response data exceeds a storage capacity of the storage unit, the information about the response data with the response frequency that is lower than a specified threshold.

Additional features and advantages are described herein, and will be apparent from the following Detailed Description and the figures.

BRIEF DESCRIPTION OF FIGURES

All drawings are intended to illustrate some aspects and examples of the present disclosure. The drawings described are only schematic and are non-limiting, and are not necessarily drawn to scale.

FIGS. 3A, 3B, and 3C are tabular diagrams illustrating configurations of address information and Simple Network Management Protocol (SNMP) response information about the image forming apparatus;

DETAILED DESCRIPTION

Various embodiments are described below with reference to the figures. It should be understood, however, that numerous variations from the depicted arrangements and functions are possible while remaining in the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Figure 1:
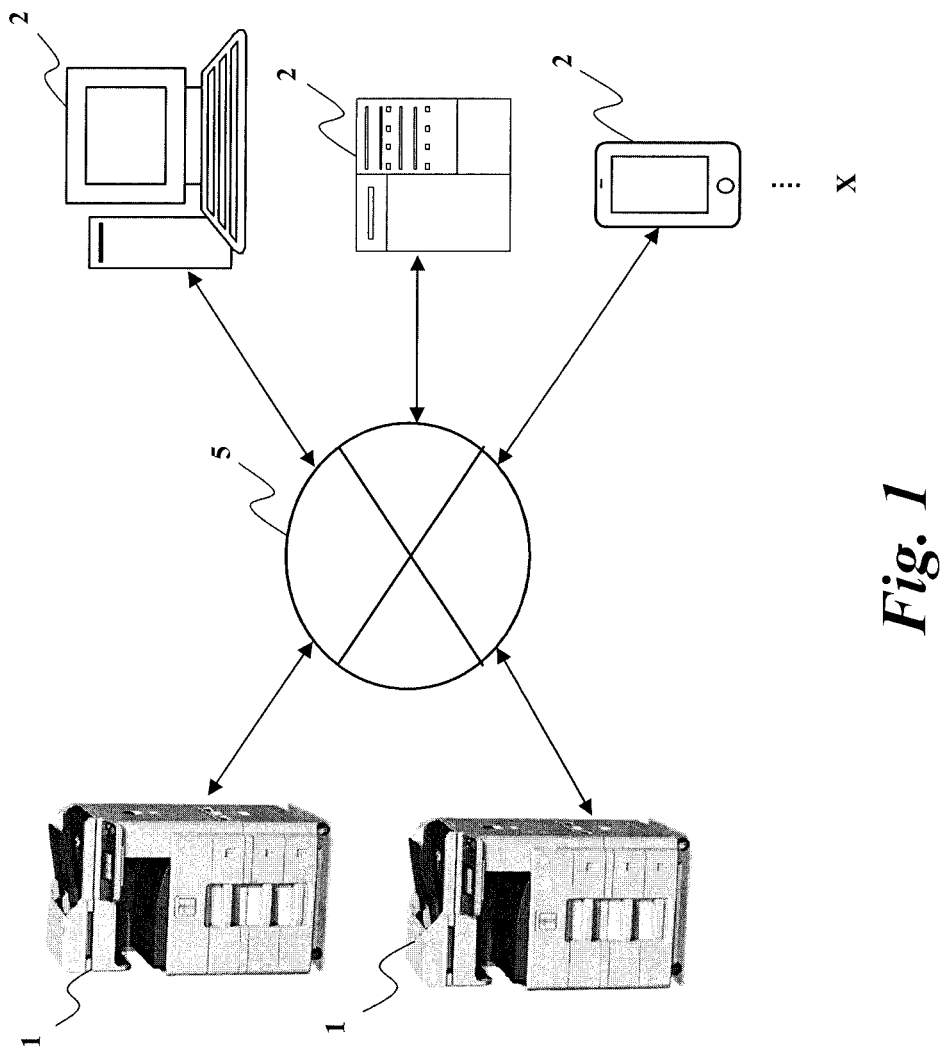
FIG. 1 is a schematic diagram illustrating a configuration of a response system in the present disclosure.

A response system X according to an embodiment of the present disclosure will be described first with reference to FIG. 1.

The response system X includes image forming apparatuses 1 and terminals 2. These forming apparatuses 1 and terminals 2 are mutually connected via a network 5.

Each image forming apparatus 1 is, for example, a printer, a multi-functional printer, a combined apparatus such as an MFP. Alternatively, the image forming apparatus 1 is another apparatus that receives information requesting data 131 via the network 5 and transmits response data 132 in response to the information requesting data 131. In this embodiment, the image forming apparatus 1 may include, for example, Simple Network Management Protocol (SNMP) agent functions.

Each terminal 2 is a computer, such as a personal computer (PC), which transmits information requesting data 131 to an image forming apparatus 1 and receives response data 132 for the information requesting data 131. The terminal 2 may include SNMP manger functions.

The network 5 is a local area network (LAN), a wireless LAN, a wide area network (WAN), a mobile telephone network, or another external network. The network 5 may transmit and receive Transmission Control Protocol/Internet Protocol (TCP/IP) packets.

Figure 2:
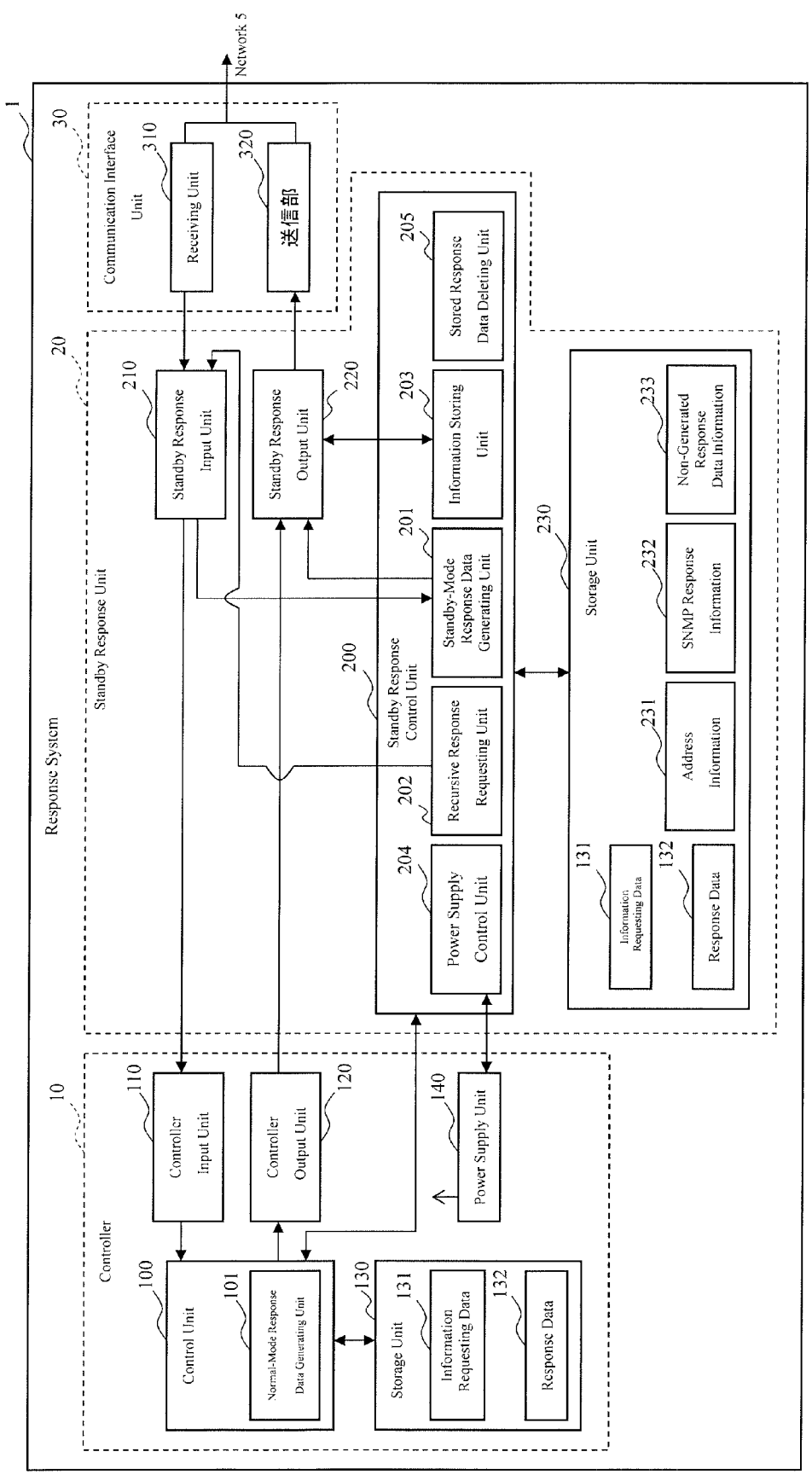
FIG. 2 is a schematic diagram illustrating a block configuration of an image forming apparatus in the response system.

Next, the control configuration of the image forming apparatus 1 will be described with reference to FIG. 2.

The image forming apparatus 1 according to an embodiment of the present disclosure includes a controller 10, a standby response unit 20, and a communication interface unit 30. These units are connected to the network 5 via a communication interface unit 30.

The controller 10 is a host controller that includes a main circuit board, which controls the units of the image forming apparatus and the like, a network card, and other functions. The controller 10 includes a control unit 100, a controller input unit 110, a controller output unit 120, a storage unit 130, and a power supply unit 140.

While the image forming apparatus 1 is in the normal mode, the controller 10 receives information requesting data 131 and outputs response data 132. Therefore, the control unit 100 processes a reception packet received by the controller input unit 110 and sends a response packet to the controller output unit 120.

The control unit 100 is a general-purpose processor (GPP), a central processing unit (CPU), a micro-processing unit (MPU), a digital signal processor (DSP), a graphics processing unit (GPU), an application specific instruction-set processor (ASIC), or the like. The control unit 100 also includes a normal-mode response data generating unit 101, which will be described below in detail.

When the control unit 100 reads out a control program stored in a read-only memory (ROM) or a hard disk drive (HDD) in the storage unit 130, stores the control program in a RAM (random-access memory), and executes the control program, the control unit 100 operates as each means of a functional block, which will described below. Then, the control unit 100 may operate as, for example, an SNMP agent. The control unit 100 also controls the whole of the image forming apparatus and the like, as commanded by prescribed information entered from an external terminal (not illustrated) or a manipulation panel (not illustrated).

The controller input unit 110 receives a packet from the standby response unit 20 and outputs the packet to the control unit 100. In other words, the control unit 100 receives, via the controller input unit 110, information requesting data 131 outputted from the standby response unit 20.

In other words, the controller input unit 110 receives information requesting data 131 that has been outputted from a receiving unit 310 in the communication interface unit 30 to the standby response unit 20 and has then been transferred from the standby response unit 20. The controller input unit 110 also receives information requesting data 131 that has been recursively transmitted from a recursive response requesting unit 202, which will be described later, and has then been outputted from the standby response unit 20.

The controller output unit 120 outputs a packet generated by the control unit 100 to the standby response unit 20. In other words, the controller output unit 120 outputs response data 132 to the standby response unit 20.

The storage unit 130 includes a semiconductor memory such as a ROM, a RAM, or a flash memory. Alternatively, the storage unit 130 includes a recording medium such an HDD. The storage unit 130 stores the information requesting data 131 and response data 132.

Even while in the standby mode, the RAM in the storage unit 130 may store the stored data with a self-refresh function or the like. Control programs that control the operation of the image forming apparatus 1 are stored in the ROM or HDD in the storage unit 130. Furthermore, an account setting of the user may be stored in the storage unit 130. An area for a user-specific storing folder may also be allocated in the storage unit 130.

During the standby mode, reading from and writing to the storage unit 130 by the standby response unit 20 may be inhibited.

The power supply unit 140 is a means for supplying electric power to the control unit 100 and other units in the controller 10. The power supply unit 140 receives an input from the standby response control unit 200 in the standby response unit 20 and controls the power supply to the control unit 100 accordingly. When the power supply is turned on, under control by the standby response unit 20, the power supply unit 140 supplies electric power to individual units. When the power supply is turned off, the power supply unit 140 stops supplying electric power to the individual units.

The normal-mode response data generating unit 101 generates response data 132 during the normal mode. The normal-mode response data generating unit 101 acquires information requesting data 131 from the controller input unit 110 and temporarily stores the information requesting data 131 in the storage unit 130.

The normal-mode response data generating unit 101 references the information requesting data 131. If a response is required, the normal-mode response data generating unit 101 generates response data 132 and outputs it to the controller output unit 120.

If a condition preset in the storage unit 130 is met, the normal-mode response data generating unit 101 causes a shift from the normal mode to the standby mode. If, for example, a time preset in a timer (not illustrated) elapses from when a command from the user is no longer detected, as the preset condition, the normal-mode response data generating unit 101 causes a shift from the normal mode to the standby mode. An example of the preset condition that the user's command is no longer detected is that a preset time elapses from the user's last touch to the manipulation panel without reception of print data or the like.

The control unit 100 in the image forming apparatus 1 functions as the normal-mode response data generating unit 101 by executing a control program stored in the storage unit 130.

The information requesting data 131 is data used to request various types of data about the image forming apparatus 1 in various protocols. The information requesting data 131 is acquired by the controller input unit 110 and is temporarily stored by the normal-mode response data generating unit 101.

The information requesting data 131 may be, for example, data of various requests such as Address Resolution Protocol (ARP) requests, Reverse Address Resolution Protocol (RARP) requests, Dynamic Host Configuration Protocol (DHCP) requests, and Bootstrap Protocol (BOOTP) requests.

The information requesting data 131 may also include data in various requests such as SNMP-Get requests including an object identifier (OID) in SNMP and SNMP-GetNext requests.

The response data 132 is data used to send a response in response to information requesting data 131 according to various protocols. The response data 132 is generated by the normal-mode response data generating unit 101 and is outputted to the controller output unit 120.

When, for example, the information requesting data 131 is an ARP request or RARP request, the response data 132 may be the Internet Protocol (IP) address or Media Access Control (MAC) address of the image forming apparatus 1.

When, for example, the information requesting data 131 is a request in SNMP, the response data 132 may include data in a SNMP-Get response, a TRAP message, or another response message that is generated with reference to an OID in a management information base (MIB) for the image forming apparatus 1.

The standby response unit 20 is a means for transmitting a standby response, the means including an ASIP that transmits a standby response to the network 5 while the image forming apparatus 1 is in the standby mode. The standby response unit 20 includes a standby response control unit 200, a standby response input unit 210, a standby response output unit 220, and a storage unit 230. These units are mutually connected with buses.

During the standby mode, the standby response unit 20 receives information requesting data 131 from the communication interface unit 30 and outputs response data 132 to the communication interface unit 30.

The standby response control unit 200 includes a control means such as a GPP, an MPU, or CPU. The standby response control unit 200, which is connected to the standby response input unit 210, standby response output unit 220, and storage unit 230, controls them. The standby response control unit 200 may consume less electric power than the control unit 100 in the controller 10.

The standby response control unit 200 includes a standby-mode response data generating unit 201, a recursive response requesting unit 202, an information storing unit 203, a power supply control unit 204, and a stored response data deleting unit 205.

The standby response input unit 210 receives a packet from the communication interface unit 30 or recursive response requesting unit 202 and outputs the packet to the controller 10 or the standby-mode response data generating unit 201 in the standby response control unit 200. The standby response input unit 210 also receives information requesting data 131 outputted from the communication interface unit 30.

The standby response output unit 220 receives a packet from the controller 10 or the standby-mode response data generating unit 201 in the standby response control unit 200 and outputs the packet to the information storing unit 203 or communication interface unit 30. The standby response output unit 220 also outputs response data 132 to the communication interface unit 30 and the information storing unit 203 in the standby response control unit 200.

The storage unit 230 includes a RAM, a ROM, a flash memory, and other recording media. The storage unit 230 may have a smaller capacity than the storage unit 130 in the controller 10.

Writing to and reading from the storage unit 230 by the standby response control unit 200 are possible during the normal mode and standby mode.

The storage unit 230 may be incorporated into the standby response control unit 200. Only programs executed by the standby response control unit 200 and data may be stored in a ROM and the like incorporated into the standby response control unit 200.

While the image forming apparatus 1 is in the standby mode, the standby-mode response data generating unit 201 generates response data 132 from address information 231 and SNMP response information 232 that have been stored in the information storing unit 203 by the storage unit 230. In other words, the standby-mode response data generating unit 201 uses data in the storage unit 230 to generate data to be transmitted in response to the packed received from the standby response input unit 210.

Specifically, the standby-mode response data generating unit 201 generates response data 132 from address information 231 in the storage unit 230 in response to, for example, a received ARP request or RARP request.

In response to, for example, a received SNMP-GET request, the standby-mode response data generating unit 201 reads data corresponding to the relevant OID from the SNMP response information 232 and generates response data 132. In this case, the standby-mode response data generating unit 201 calculates a response frequency for data corresponding to each OID in the SNMP response information 232 and stores the response frequency. The standby-mode response data generating unit 201 may calculate a response frequency for the address information 231, as well and may store the response frequency.

If the standby-mode response data generating unit 201 cannot generate response data 132 during the standby mode, the standby-mode response data generating unit 201 causes the controller 10 to return to the normal mode. Therefore, the standby-mode response data generating unit 201 causes the power supply control unit 204 to notify the power supply unit 140 of a return command. If the information requesting data 131 in response to which response data 132 failed to be generated is an SNMP request, the standby-mode response data generating unit 201 stores information about the OID corresponding to the information requesting data 131 in non-generated response data information 233 stored in the storage unit 230.

The recursive response requesting unit 202 is a request generating means that recursively transmits, to the normal-mode response data generating unit 101, information requesting data 131 that requests information about other response data 132 during the normal mode.

When the normal-mode response data generating unit 101 generates response data 132 including a specified particular type of information in response to information requesting data 131 received from the outside, the recursive response requesting unit 202 requests information other response data 132.

Specifically, the recursive response requesting unit 202 detects that the information storing unit 203 has stored the IP address and MAC address in the address information 231 and then causes the controller 10 to recursively transmit data included in the MIB in SNMP. Therefore, the recursive response requesting unit 202 acquires the IP address and MAC address from, for example, the storage unit 230, generates a packet including an SNMP-GetNext request, and causes the standby response input unit 210 to input the request.

During the normal mode, the information storing unit 203 stores information about the response data 132 generated by the normal-mode response data generating unit 101 in the storage unit 230, which may be read during the standby mode, as the address information 231 and SNMP response information 232. In this case, the information storing unit 203 acquires information about response data 132 that is outputted from the controller 10 via the standby response output unit 220 to the communication interface unit 30, and stores the information. Therefore, the information storing unit 203 acquires a packet output from the standby response output unit 220, analyzes the packet, and stores necessary information in the storage unit 230.

Specifically, when a packet in ARP or RARP is inputted, the information storing unit 203 sets the IP address and MAC address in the address information 231 and stores them.

When an SNMP response packet is inputted, the information storing unit 203 similarly stores the OID and response data 132 in the SNMP response information 232. In this case, the information storing unit 203 preferentially stores information about response data 132 generated by the normal-mode response data generating unit 101 in correspondence to non-generated response data information 233 over information about response data 132 with a low response frequency. Thus, during the normal mode, the information storing unit 203 may OID-associated update data with a high response frequency in the MIB in SNMP for the image forming apparatus 1 and may store them in the SNMP response information 232.

During the normal mode, the information storing unit 203 also stores information about response data 132 that has been generated by the normal-mode response data generating unit 101 in response to information requesting data 131 recursively transmitted by the recursive response requesting unit 202.

If the information storing unit 203 acquires a particular type of information, the information storing unit 203 may notify the recursive response requesting unit. If, for example, a packet in ARP or RAPR is inputted and the IP address and MAC address are stored in the address information 231 for the first time, the information storing unit 203 sends a notification to the recursive response requesting unit 202 in the standby response control unit 200 (this notification will be referred to below as the address storage notification).

The power supply control unit 204 controls the power supply unit 140 in the controller 10 so that the power supply unit 140 is turned on and off.

When receiving a shift-to-standby-mode command from the controller 10, the power supply control unit 204 turns off the power supply unit 140 in the controller 10 and causes the standby response unit 20 to start process in the standby mode.

When receiving a shift-to-normal-mode command from the standby-mode response data generating unit 201, the power supply control unit 204 turns on the power supply unit 140. Then, the power supply control unit 204 causes the power supply unit 140 to restore power supply to the controller 10, starting process in the normal mode.

If the amount of information about response data 132 stored by the information storing unit 203 exceeds the storage capacity of the storage unit 230, the stored response data deleting unit 205 deletes, from the SNMP response information 232, OID-associated data with a response frequency lower than a specified threshold during the normal mode. The specified threshold may be set in response to a command entered by the user from the manipulation panel of the image forming apparatus 1 or a terminal 2, and may be stored in the storage unit 130 or storage unit 230. The specified threshold may also be adjusted by the stored response data deleting unit 205 according to the capacity of the storage unit 230 and the response frequency of each OID-associated data item.

The standby response control unit 200 in the image forming apparatus 1 functions as the standby-mode response data generating unit 201, recursive response requesting unit 202, information storing unit 203, and power supply control unit 204 by executing control programs stored in the storage unit 230.

The storage unit 230 stores the information requesting data 131, address information 231, SNMP response information 232, and non-generated response data information 233. The configurations of these information items will be described later.

The SNMP response information 232 and non-generated response data information 233 may not have been set when the image forming apparatus 1 is started.

The communication interface unit 30 is an interface in the physical layer, that converts logical signals into actual electric signals, of an interface such as an Ethernet (registered trademark) interface. The communication interface unit 30 may be a removable LAN interface used for a connection to the network 5.

The communication interface unit 30 includes a receiving unit 310 and a transmitting unit 320.

The receiving unit 310 receives data such as an Ethernet (registered trademark) frame or packet (the data will be referred to below as a packet) from the network 5 and outputs the packet to the standby response unit 20. Specifically, the receiving unit 310 receives a packet of information requesting data 131 transmitted from a terminal 2 and outputs the information requesting data 131 to the standby response unit 20.

The transmitting unit 320 receives a packet output from the standby response unit 20 and transmits the packet to the network 5. Specifically, the transmitting unit 320 receives response data 132 from the standby response unit 20 and outputs a packet of the response data 132 to a terminal 2.

The units in the image forming apparatus 1 are hardware resources that perform the network response method in the present disclosure.

Next, the configurations of the address information 231, SNMP response information 232, and non-generated response data information 233 stored in the storage unit 230 in the standby response unit 20 will be described with reference to FIGS. 3A to 3C.

The configuration of the address information 231 illustrated in FIG. 3A will be described first. The address information 231 is a table that stores the IP address and MAC address of the image forming apparatus 1.

Specifically, items named "IP address" and "MAC address (Ethernet (registered trademark) address" are set in the address information 231.

The IP address, which is to be set in the response data 132, of the image forming apparatus 1 is acquired by the information storing unit 203 and is then stored in "IP address".

The MAC address, which is to be set in the response data 132, corresponding to the IP address of the image forming apparatus 1 is acquired by the information storing unit 203 and is then stored in "MAC address".

Next, the configuration of the SNMP response information 232 illustrated in FIG. 3B will be described. The SNMP response information 232 is a table that stores the MIB and the like used in response data 132, in SNMP, which is output from the controller 10; the SNMP response information 232 stores OIDs and response data 132.

Information about response data 132 corresponding to information requesting data 131 in SNMP is stored in the SNMP response information 232. Items named "OID" and "Data" are set in the SNMP response information 232. Identifiers assigned to identify objects in management information items stored in the MIB in SNMP are stored in "OID". Identifiers in "OID" in the SNMP response information 232 may be stored in a tree configuration. Data corresponding to "OID" set in the response data 132, data used for response management, and the like are stored in "Data". Items named "Type", "Data value", "Last response time", and "Response frequency" are set in "Data". The type of each data value in "Data value" is stored in "Type". If the type of data is, for example, the integer data type, "INTEGER" is stored. If the data type is the string data type, "STRING" is stored. Actual data values are stored in "Data value". In "Last response time", information about a time at which the most recent response was made in correspondence to the relevant OID is stored in, for example, "month, day, year, hours, minutes" format. A history of a plurality of response times may be stored. In "Response frequency", a frequency of response corresponding to the relevant OID in a specified period is stored. In the example in FIG. 3B, the number of times a response corresponding to the relevant OID was made in a specified period is simply stored as the response frequency. The specified period may be set by the user from the manipulation panel of the image forming apparatus 1 or a terminal 2. The specified period may be adjusted by the stored response data deleting unit 205 according to, for example, the total number of responses in the image forming apparatus 1 or the storage capacity of the storage unit 230.

Next, the configuration of the non-generated response data information 233 illustrated in FIG. 3C will be described. The non-generated response data information 233 is a table that stores OIDs for which response data 132 failed to be generated in response to an SNMP packet received during the standby mode. When the image forming apparatus 1 returns from the standby mode to the normal mode, the information storing unit 203 preferentially stores, in the SNMP response information 232, information about the response data 132 corresponding to an OID stored in the non-generated response data information 233.

Figure 4:
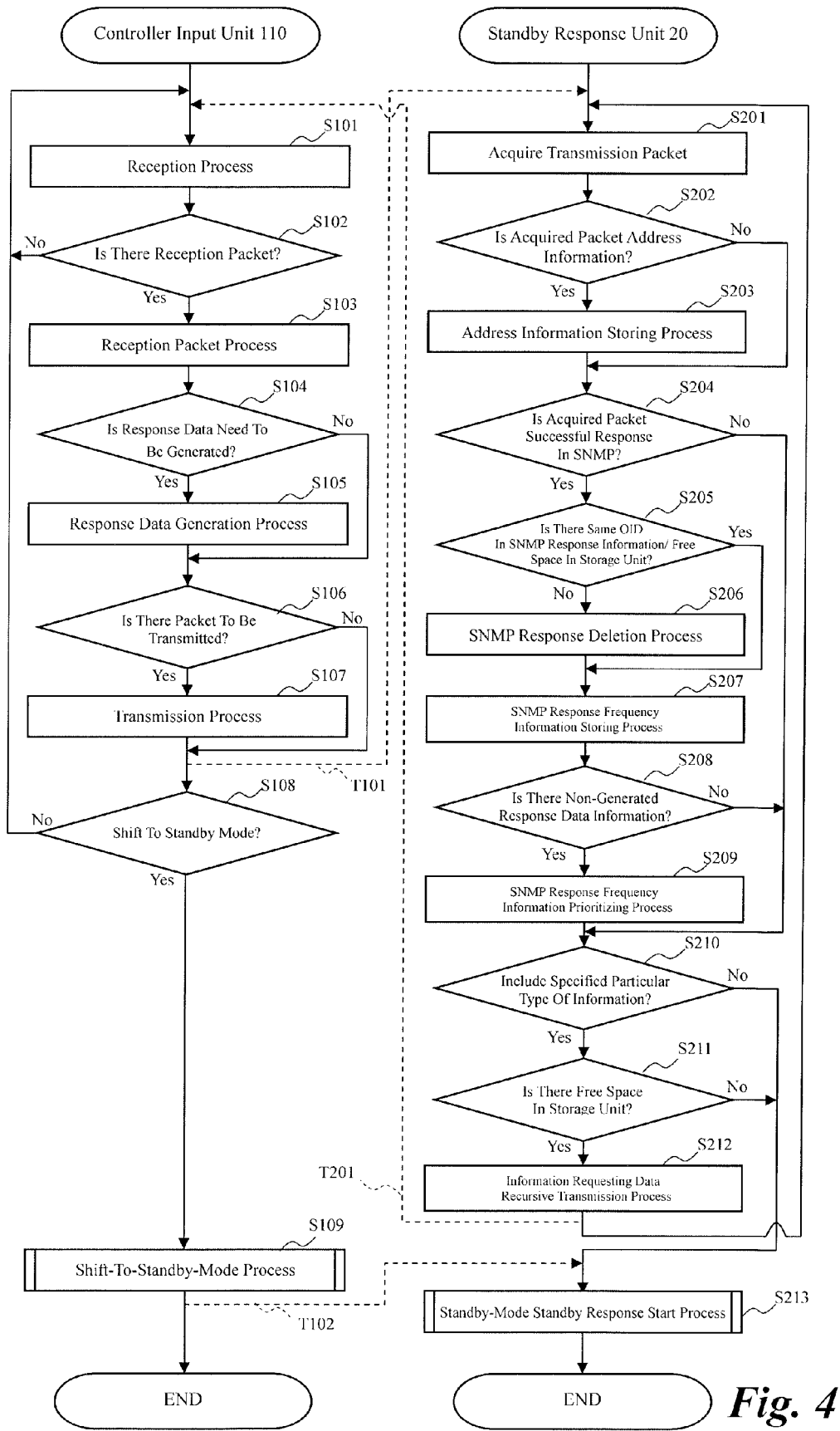
FIG. 4 is a flowchart of normal-mode process performed by the image forming apparatus.

Next, normal-mode process according to an embodiment of the present disclosure, which is operation of the image forming apparatus 1 in the normal mode, will be described with reference to FIGS. 4 to 6.

In normal-mode process in this embodiment, during the normal mode, the controller 10 generates response data 132 in response to information requesting data 131 as a response. In this case, the standby response unit 20 acquires a packet to be transmitted, extracts information necessary for a response to be made in the standby mode, and stores the acquired information in the storage unit 230 from the packet. Specifically, if the controller 10 transmits response data 132 including the IP address and MAC address, that is, response data 132 in the MIB in SNMP, the standby response unit 20 acquires the response data 132. In this case, the standby response unit 20 deletes stored data with a low frequency. The standby response unit 20 preferentially stores response data 132 that failed to be generated during the standby mode. After having acquired the response data 132 including the IP address and MAC address, the standby response unit 20 recursively transmits an SNMP-GetNext request to the controller 10, after which the standby response unit 20 stores response data 132 in SNMP.

Normal-mode process in this embodiment is mainly performed as follows: in the controller 10, the controller control unit 100 reads out programs stored in the storage unit 130 and, in the standby response unit 20, the standby response control unit 200 calls programs stored in the storage unit 230, and hardware resources are used in collaboration with individual units.

Normal-mode process will be described below in detail for each step with reference to the flowchart in FIG. 4.

<Step S101>

First, the controller input unit 110 performs reception process.

In this step, if the receiving unit 310 in the communication interface unit 30 receives a packet from the network 5, the packet is inputted to the standby response input unit 210 in the standby response unit 20. A packet recursively transmitted from the recursive response requesting unit 202 in the standby response control unit 200 is also inputted to the standby response input unit 210.

Next, the packet that has been inputted from the communication interface unit 30 to the standby response input unit 210 is then inputted to the controller input unit 110 in the controller 10.

If the response data 132 failed to be generated during the standby mode, as described later, a packet of information requesting data 131 corresponding to the non-generated response data 132 is input to the controller input unit 110. Thus, an SNMP request that matches an OID stored in the non-generated response data information 233 is acquired.

The controller input unit 110 outputs these packets that it received to the control unit 100 as reception packets.

<Step S102>

Next, the control unit 100 functions as the normal-mode response data generating unit 101 and determines whether there is a reception packet. If a packet has been inputted to the controller input unit 110 in step S101 as described above, the control unit 100 produces a Yes result. Otherwise, the control unit 100 produces a No result.

In the case of a Yes result, the control unit 100 causes the sequence to proceed to step S103.

In the case of a No result, the control unit 100 returns the sequence to step S101, where the control unit 100 waits until a packet is received.

<Step S103>

If there is a reception packet or recursive response packet, the control unit 100 functions as the normal-mode response data generating unit 101 and performs reception packet process.

In this process, the control unit 100 processes the packet received at the controller input unit 110.

If the received packet is a packet necessary for various types of control, including image formation, by the image forming apparatus 1, the control unit 100 performs necessary process according to various types of protocols corresponding to the acquired packet.

If the received packet is information requesting data 131, the control unit 100 temporarily stores the packet in the storage unit 130.

<Step S104>

Next, the control unit 100 functions as the normal-mode response data generating unit 101 and determines whether response data 132 needs to be generated. If the received packet is information requesting data 131 and response data 132 needs to be generated, the control unit 100 produces a Yes result. Otherwise, the control unit 100 produces a No result.

In the case of a Yes result, the control unit 100 causes the sequence to proceed to step S105.

In the case of a No result, the control unit 100 causes the sequence to proceed to step S106.

<Step S105>

If response data 132 needs to be generated, the control unit 100 functions as the normal-mode response data generating unit 101 and performs response data generation process.

In this process, the control unit 100 generates response data 132 corresponding to the temporarily stored information requesting data 131.

<Step S106>

The control unit 100 functions as the normal-mode response data generating unit 101 and determines whether there is a packet to be transmitted. If response data 132 has been generated, the control unit 100 produces a Yes result. If the received packet is necessary for various types of control by the image forming apparatus 1 and the control unit 100 thereby has performed necessary process and has generated a transmission packet to be transmitted, the transmission packet conforming to various types of protocols, the control unit 100 also produces a Yes result. Otherwise, the control unit 100 produces a No result.

In the case of a Yes result, the control unit 100 causes the sequence to proceed to step S107.

In the case of a No result, the control unit 100 causes the sequence to proceed to step S108.

<Step S107>

If there is a transmission packet that needs to be transmitted, the control unit 100 functions as the normal-mode response data generating unit 101 and performs transmission process as described below.

In this process, the control unit 100 causes the controller output unit 120 to output the transmission packet.

The controller output unit 120 outputs the transmission packet to the standby response output unit 220 in the standby response unit 20.

The standby response output unit 220 outputs the transmission packet to the transmitting unit 320 in the communication interface unit 30. The transmitting unit 320 outputs the transmission packet to the network 5.

The transmission packet is also outputted from the standby response output unit 220 to the information storing unit 203 in the standby response control unit 200 in the standby response unit 20 (timing T101).

<Step S201>

After the response data 132 has been transmitted, the standby response control unit 200 in the standby response unit 20 functions as the information storing unit 203 and performs the transmission packet acquisition process.

In this process, the standby response control unit 200 acquires the transmission packet from the standby response output unit 220 and analyzes the transmission packet.

<Step S202>

Next, the standby response control unit 200 functions as the information storing unit 203 and determines whether the acquired packet is address information. If the acquired transmission packet is a packet, in ARP or RARP, of response data 132, the standby response control unit 200 produces a Yes result. Otherwise, the standby response control unit 200 produces a No result.

In the case of a Yes result, the standby response control unit 200 causes the sequence to proceed to step S203.

In the case of a No result, the standby response control unit 200 causes the sequence to proceed to step S204.

<Step S203>

If the packet includes response data 132 in ARP or RARP, the standby response control unit 200 functions as the information storing unit 203 and performs address information storing process.

Figure 5:
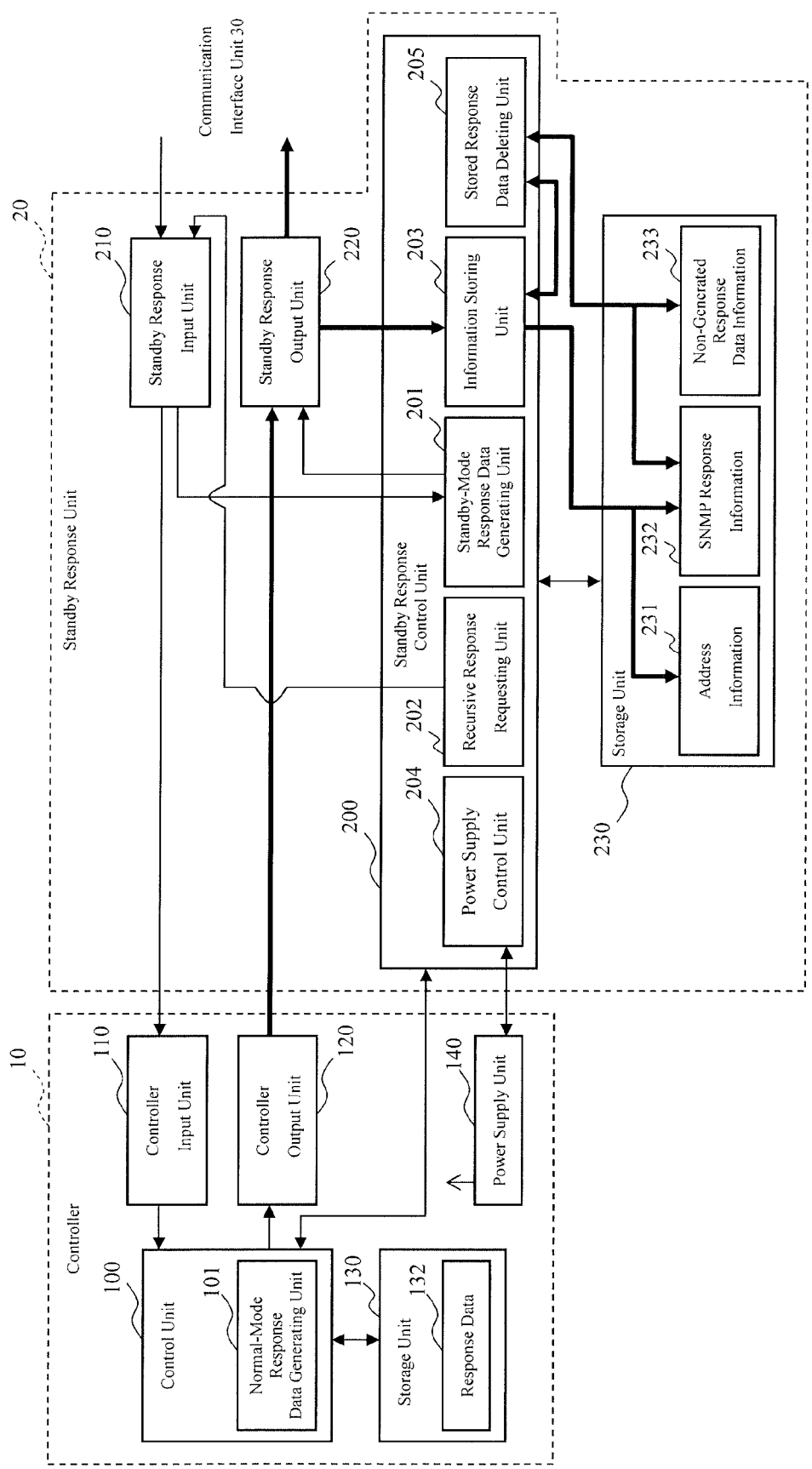
FIG. 5 is a schematic diagram illustrating address information storing process and SNMP response information storing process in the flowchart in FIG. 4.

As shown in FIG. 5, the standby response control unit 200 stores, in the address information 231 in the storage unit 230, the IP address and MAC address of the transmission source from which the packet has been transmitted. That is, the IP address and MAC address of the image forming apparatus 1 are stored in the address information 231. In this case, the standby response control unit 200 sends an address storage notification to the recursive response requesting unit 202.

<Step S204>

The standby response control unit 200 functions as the information storing unit 203 and determines whether the acquired packet is a successful response in SNMP. If the acquired response is response data 132 including an SNMP-Get response or a TRAP response and is in a normal status or the like, the standby response control unit 200 produces a Yes result. Otherwise, the standby response control unit 200 produces a No result.

In the case of a Yes result, the standby response control unit 200 causes the sequence to proceed to step S205.

In the case of a No result, the standby response control unit 200 causes the sequence to proceed to step S210.

<Step S205>

If the acquired packet is a successful SNMP response, the standby response control unit 200 functions as the stored response data deleting unit 205 and determines whether there is the same OID in the SNMP response information 232 or there is a free space in it. Specifically, if the SNMP response information 232 in the storage unit 230 includes the same OID as an OID in the acquired response data 132, the standby response control unit 200 produces a Yes result. If there is a free space in the area in which the SNMP response information 232 is stored, the standby response control unit 200 also produces a Yes result. Conversely, if the same OID as the OID in the acquired response data 132 is not present in the SNMP response information 232 and the storage unit 230 has no frees storage space in the area in which the SNMP response information 232 is stored, the standby response control unit 200 produces a No result.

In the case of a Yes result, the standby response control unit 200 causes the sequence to proceed to step S207.

In the case of a No result, the standby response control unit 200 causes the sequence to proceed to step S206.

<Step S206>

If the same OID is not present in the SNMP response information 232 and there is no free storage space in the area in which the SNMP response information 232 is stored, the standby response control unit 200 functions as the stored response data deleting unit 205 and performs SNMP response deletion process.

As shown in FIG. 5, the standby response control unit 200 searches the SNMP response information 232 for OID-associated data with a response frequency lower than a specified threshold stored in the storage unit 230 and deletes the searched-for data. In this case, the standby response control unit 200 may delete only the OID-associated data with the lowest response frequency.

Even if the standby response control unit 200 receives an SNMP request having the same OID as an OID stored in the non-generated response data information 233, if there is no free space in the area in which the SNMP response information 232 is stored, the standby response output unit 220 also deletes OID-associated data with a low response frequency.

<Step S207>

The standby response control unit 200 functions as the information storing unit 203 and performs SNMP response frequency information storing process.

As shown in FIG. 5, the standby response control unit 200 stores, in the SNMP response information 232, the OID and response data 132 included in the acquired packet.

In this case, the standby response control unit 200 acquires the time at which the packet was acquired from a timer for each OID, and stores the acquired time in the SNMP response information 232. The standby response control unit 200 also calculates the response frequency by incrementing the number of responses and stores the calculated response frequency. The standby response control unit 200 may simply obtain the number of responses for each OID in a specified period as this response frequency and may store it. Alternatively, the standby response control unit 200 may calculate a value, like a frequency in a probability distribution, from the number of responses for all OIDs in the specified period and the number of responses for each OID.

<Step S208>

Next, the standby response control unit 200 functions as the information storing unit 203 and determines whether there is non-generated response data information 233. If response data 132 failed to be generated during the standby mode and the image forming apparatus 1 returned to the normal mode and an OID has been thereby stored in the non-generated response data information 233, the standby response control unit 200 produces a Yes result. If no OID has been stored in the non-generated response data information 233, the standby response control unit 200 produces a No result.

In the case of a Yes result, the standby response control unit 200 causes the sequence to proceed to step S209.

In the case of a No result, the standby response control unit 200 causes the sequence to proceed to step S210.

<Step S209>

If an OID has been stored in the non-generated response data information 233, the standby response control unit 200 functions as the information storing unit 203 and performs SNMP response frequency information prioritizing process.

In this process, the standby response control unit 200 increases a value such as the response frequency of OID-associated data, in the SNMP response information 232, corresponding to the OID in the non-generated response data information 233 by a prescribed value and performs other process so that OID-associated data is preferentially retained in the storage unit 230.

After that, the standby response control unit 200 may delete the OID in the non-generated response data information 233.

<Step S210>

The standby response control unit 200 functions as the recursive response requesting unit 202 and determines whether the acquired packet includes a specified particular type of information. If, for example, the IP address and MAC address of the transmission source from which the response data 132 has been transmitted are included in the address information 231 in the storage unit 230 as a specified particular type of information and the standby response control unit 200 receives an address storage notification from the information storing unit 203, the standby response control unit 200 produces a Yes result. Otherwise, the standby response control unit 200 produces a No result.

In the case of a Yes result, the standby response control unit 200 causes the sequence to proceed to step S211.

In the case of a No result, the standby response control unit 200 causes the sequence to proceed to step S213.

<Step S211>

If the acquired packet includes a specified particular type of information, the standby response control unit 200 functions as the recursive response requesting unit 202 and determines whether the storage unit 230 has a free space in the area in which the SNMP response information 232 is stored. If the table of the SNMP response information 232 has a free space, the standby response control unit 200 produces a Yes result. Otherwise, the standby response control unit 200 produces a No result.

In the case of a Yes result, the standby response control unit 200 causes the sequence to proceed to step S213.

In the case of a No result, the standby response control unit 200 causes the sequence to proceed to step S212.

<Step S212>

If the table of the SNMP response information 232 has a free space, the standby response control unit 200 functions as the recursive response requesting unit 202 and performs information requesting data recursive transmission process.

Figure 6:
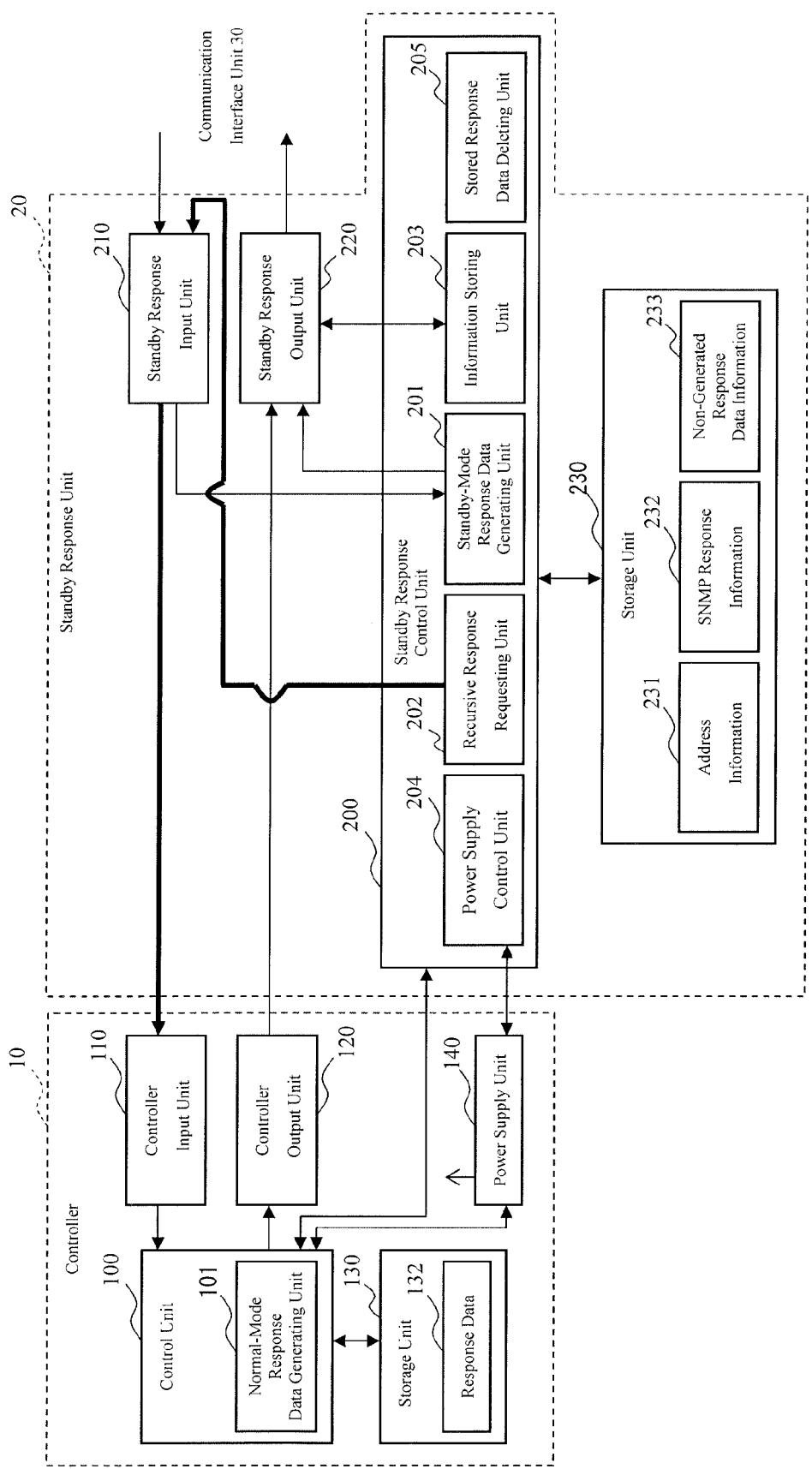
FIG. 6 is a schematic diagram illustrating information requesting data recursive transmission process in the flowchart in FIG. 4.

As shown in FIG. 6, the standby response control unit 200 generates a packet of an SNMP-GetNext request and causes the standby response input unit 210 to input the packet. In this case, the standby response control unit 200 may set a first OID to "root" (timing T201).

Then, the standby response control unit 200 returns the sequence to step S201.

After that, the standby response control unit 200 transmits a GetNext request by using the OID included in the last SNMP response acquired.

<Step S108>

The process performed by the controller 10 will be further described.

In this step, the control unit 100 in the controller 10 functions as the normal-mode response data generating unit 101 and determines whether to shift to the standby mode. If a preset condition is met, the control unit 100 produces a Yes result. Otherwise, the control unit 100 produces a No result.

In the case of a Yes result, the control unit 100 causes the sequence to proceed to step S109.

In the case of a No result, the control unit 100 returns the sequence to step S101, where the control unit 100 continues various types of process by the host controller.

<Step S109>

To shift to the standby mode, the control unit 100 functions as the normal-mode response data generating unit 101 and performs shift-to-standby-mode process.

In this case, the control unit 100 transmits a shift-to-standby-mode command to the standby response unit 20 (timing T102).

Shift-to-standby-mode process will be described later.

This completes the process by the controller 10 in the normal-mode process.

<Step S213>

The process by the standby response unit 20 will be further described.

In this step, the standby response control unit 200 in the standby response unit 20 waits until the controller 10 shifts to the standby mode.

When receiving of the shift-to-standby-mode command from the controller 10, the standby response control unit 200 in the standby response unit 20 functions as the power supply control unit 204 and performs standby-mode standby response start process.

The standby response control unit 200 starts the process to be performed in the standby mode in the standby response unit 20.

The standby-mode standby response start process will also be described later.

After that, the standby response control unit 200 terminates the process by the standby response unit 20 in the normal-mode process.

This completes the normal-mode process according to an embodiment of the present disclosure.

Next, the shift-to-standby-mode process in step S109 and standby-mode standby response start process in step S213 in FIG. 4 will be described with reference to FIG. 7.

<Step S121>

First, the control unit 100 in the controller 10 performs the self-refresh applying process.

The control unit 100 stores various states and the like in the HDD, the flash memory, or another recording medium in the storage unit 130. If the control unit 100 does not make an access within a specified time, the RAM and the like in the storage unit 130 enter a self-refresh state.

<Step S122>

Next, the control unit 100 performs the standby-mode shift command transmission process.

In this process, the control unit 100 transmits, to the standby response control unit 200 in the standby response unit 20, a standby-mode shift command, which shows that a shift to the standby mode has occurred (timing T102).

This completes the shift-to-standby-mode process by the controller 10.

<Step S221>

Next, the standby response control unit 200, which has received the shift-to-standby-mode command, in the standby response unit 20 performs the reception output switchover process.

In this process, the standby response control unit 200 switches the destination of an output produced by the standby response input unit 210 to the standby-mode response data generating unit 201.

<Step S222>

Next, the standby response control unit 200 performs the transmission output switchover process.

In this process, the standby response control unit 200 switches the destination of an output produced by the standby response output unit 220 to both the transmitting unit 320 in the communication interface unit 30 and the information storing unit 203 in the standby response control unit 200.

<Step S223>

Next, the standby response control unit 200 performs the power supply control process.

In this process, the standby response control unit 200 controls the power supply unit 140 in the controller 10 so that power supply is turned off.

The standby response control unit 200 also reads out a control program executed in the standby mode from the HDD, the flash memory, or the like in the storage unit 230, loads the read-out control program into the RAM, and starts to execute standby-mode process.

This completes the standby-mode standby response start process by the standby response unit 20.

Figure 8:
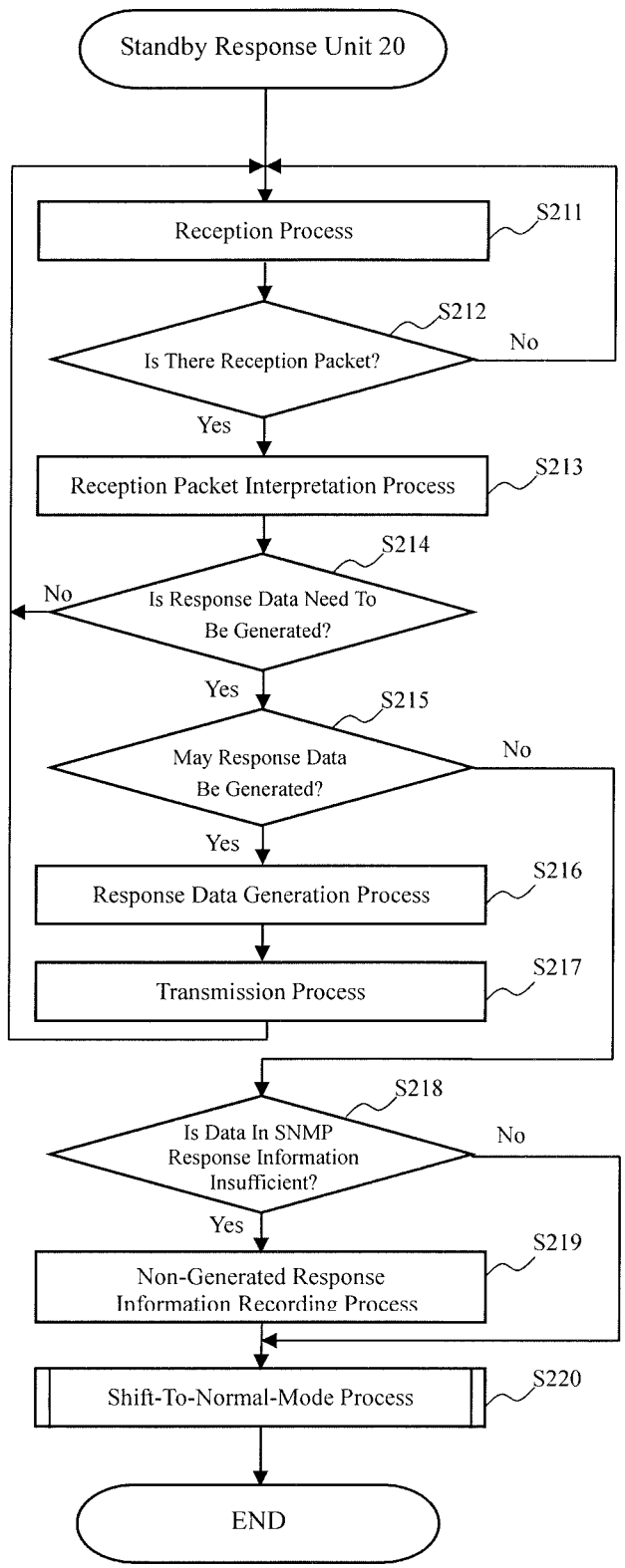
FIG. 8 is a flowchart of standby-mode process performed by the image forming apparatus.

Next, the standby-mode process, in an embodiment of the present disclosure, performed by the image forming apparatus 1 will be described with reference to FIGS. 8 and 9.

In standby-mode process in this embodiment, the standby response unit 20 generates response data 132 from the address information 231 and SNMP response information 232 stored in the storage unit 230 by the information storing unit 203 as a response during the standby mode. If a response to the packet cannot be made, the controller 10 is returned to the normal mode so that it takes action. If the packet for which a response failed to be generated is an SNMP request, the standby response unit 20 stores the relevant OID.

The standby-mode process in this embodiment is mainly performed as follows: the standby response control unit 200 in the standby response unit 20 reads out programs stored in the storage unit 230 and hardware resources are used in collaboration with individual units.

The standby-mode process will be described below for each step with reference to the flowchart in FIG. 8.

<Step S211>

First, the standby response control unit 200 in the standby response unit 20 functions as the standby-mode response data generating unit 201 and performs the reception process.

Figure 9:
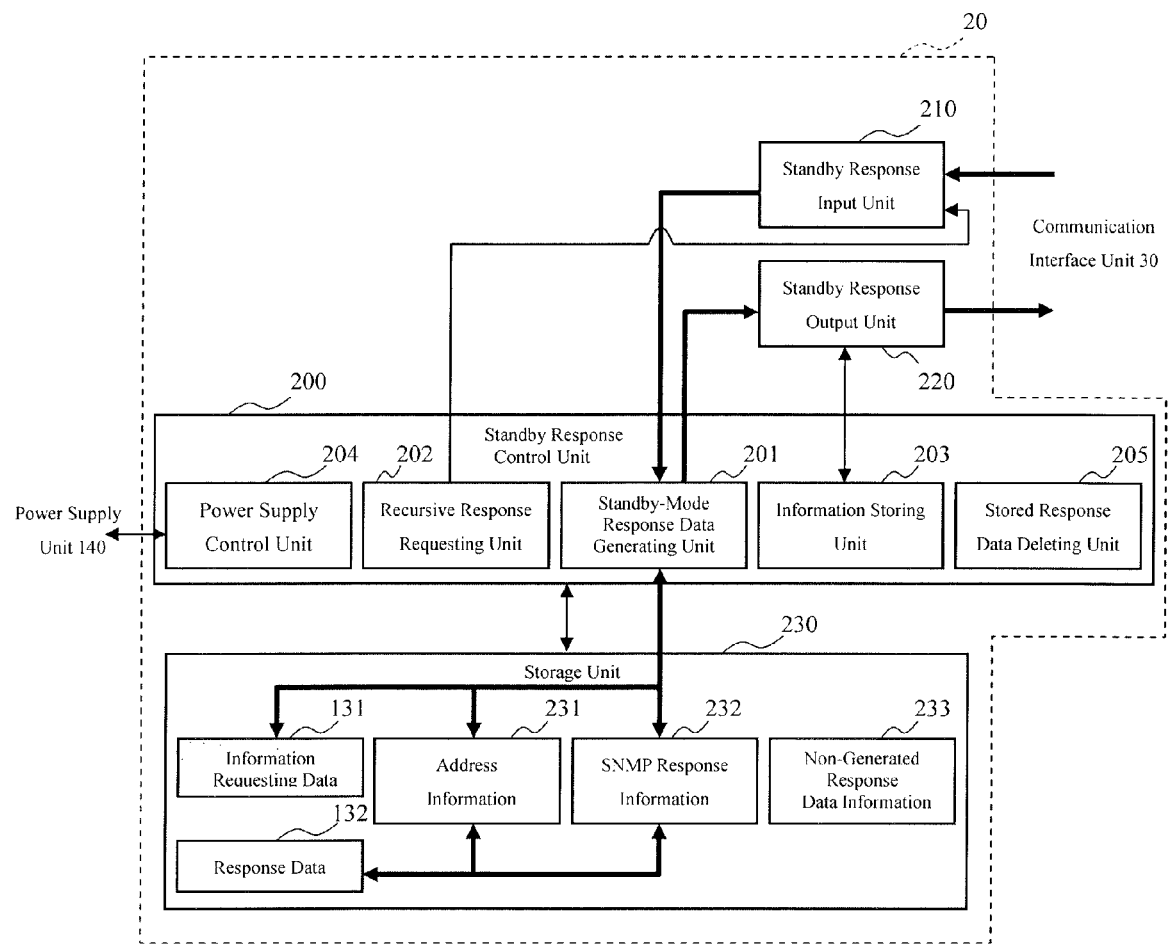
FIG. 9 is a schematic diagram illustrating response data generation process in the flowchart in FIG. 8.

As indicated in FIG. 9, when the receiving unit 310 receives a packet from the network 5, the received packet is inputted to the standby response input unit 210. The packet is further inputted to the standby-mode response data generating unit 201 in the standby response control unit 200.

<Step S212>

Next, the standby response control unit 200 functions as the standby-mode response data generating unit 201 and determines whether there is a received packet. If there is a received packet, the standby response control unit 200 produces a Yes result. Otherwise, the standby response control unit 200 produces a No result.

In the case of a Yes result, the standby response control unit 200 causes the sequence to proceed to step S213.

In the case of a No result, the standby response control unit 200 returns the sequence to step S211, where the standby response control unit 200 waits until a packet is received.

<Steps S213>

If there is a received packet, the standby response control unit 200 functions as the standby-mode response data generating unit 201 and performs a reception packet interpretation process.

The standby response control unit 200 makes an interpretation as to whether the image forming apparatus 1 needs to respond, from the protocol of the received packet, information about the transmission destination, and the like. If the image forming apparatus 1 needs to respond, the standby response control unit 200 also makes an interpretation as to, for example, whether the standby response unit 20 may respond or the controller 10 needs to respond.

If the received packet is information requesting data 131, the standby response control unit 200 temporarily stores the packet in the storage unit 230.

<Step S214>

Next, the standby response control unit 200 functions as the standby-mode response data generating unit 201 and determines whether response data 132 needs to be generated. If the packet needs a response from the image forming apparatus 1, the standby response control unit 200 produces a Yes result. Otherwise, the standby response control unit 200 produces a No result.

In the case of a Yes result, the standby response control unit 200 causes the sequence to proceed to step S215.

In the case of a No result, the standby response control unit 200 returns the sequence to step S211, where the standby response control unit 200 continues to receive a packet.

<Step S215>

If the packet does not need a response, the standby response control unit 200 functions as the standby-mode response data generating unit 201 and determines whether response data 132 may be generated. Specifically, the standby response control unit 200 references the storage unit 230 and determines whether response data 132 may be generated from the address information 231 and SNMP response information 232. If response data 132 may be generated, the standby response control unit 200 produces a Yes result. If response data 132 cannot be generated, the standby response control unit 200 produces a No result. Specific examples of the inability to generate response data 132 include a case in which neither the IP address nor the MAC address has been stored in the address information 231, a case in which data in the SNMP response information 232 is insufficient, and a case in which the protocol of the packet is not ARP or SNMP.

In the case of a Yes result, the standby response control unit 200 causes the sequence to proceed to step S216.

In the case of a No result, the standby response control unit 200 causes the sequence to proceed to step S218.

<Step S216>

If response data 132 may be generated, the standby response control unit 200 functions as the standby-mode response data generating unit 201 and performs the response data generation process.

As indicated in FIG. 9, the standby response control unit 200 generates, from data in the address information 231 and SNMP response information 232, a packet of response data 132 to be transmitted as a response to the received packet, and temporarily stores the packet in the storage unit 230.

<Step S217>

The standby response control unit 200 functions as the standby-mode response data generating unit 201 and performs the transmission process.

In this process, the standby response control unit 200 receives a packet to be transmitted as response data 132 from the standby-mode response data generating unit 201 and then outputs the packet via the standby response output unit 220 in the standby response unit 20 to the transmitting unit 320 in the communication interface unit 30.

The packet is then transmitted from the transmitting unit 320 to the network 5.

<Step S218>

If the packet needs a response but response data 132 cannot be generated, the standby response control unit 200 functions as the standby-mode response data generating unit 201 and determines whether data in the SNMP response information 232 is insufficient. Although, for example, the received packet is an SNMP request and the IP address and MAC address are stored in the address information 231, if data corresponding to the relevant OID is not stored in the SNMP response information 232 and response data 132 cannot thereby be generated, the standby response control unit 200 produces a Yes result. Otherwise, the standby response control unit 200 produces a No result.

In the case of a Yes result, the standby response control unit 200 causes the sequence to proceed to step S219.

In the case of a No result, the standby response control unit 200 causes the sequence to proceed to step S220.

<Step S219>

If data in the SNMP response information 232 is insufficient, the standby response control unit 200 functions as the standby-mode response data generating unit 201 and performs the non-generated response information recording process.

Figure 10:
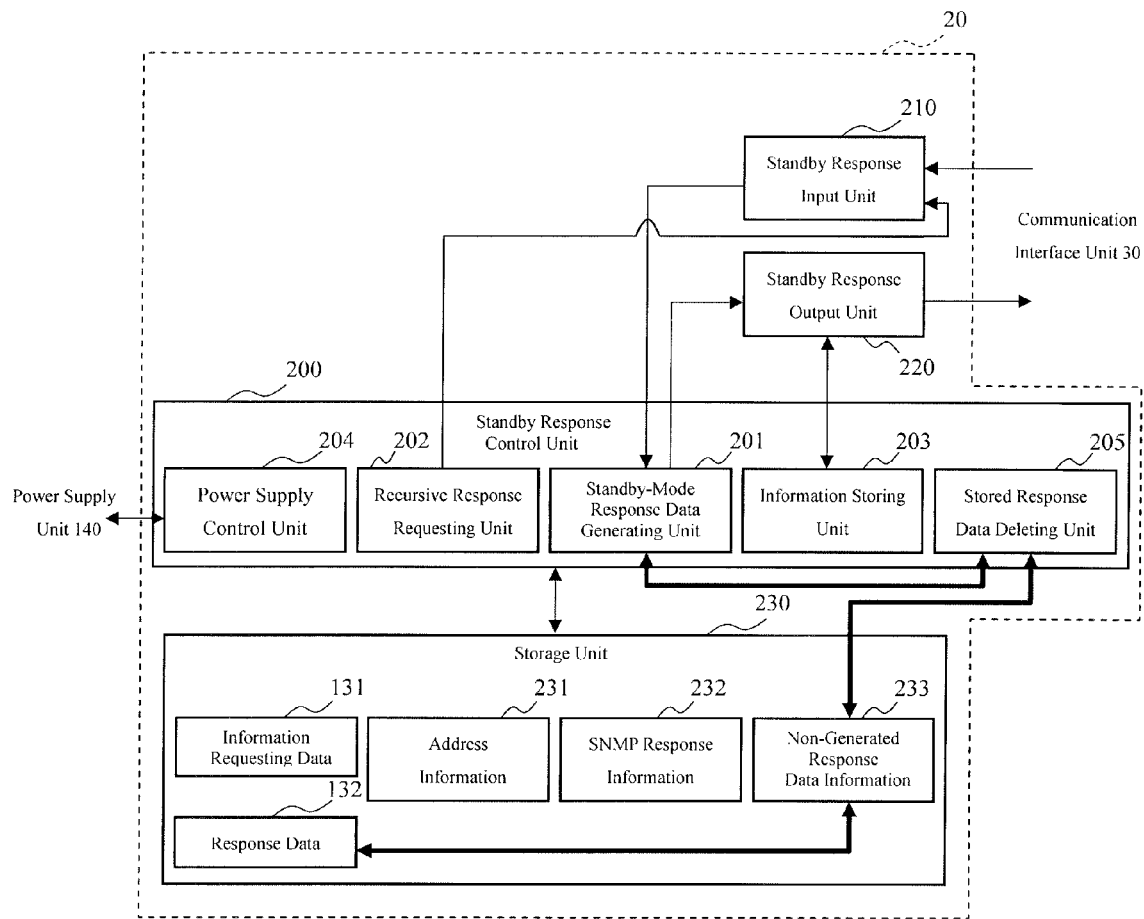
FIG. 10 is a schematic diagram illustrating non-generated response information recording process in the flowchart in FIG. 8.

As shown in FIG. 10, the standby response control unit 200 writes, to the non-generated response data information 233, the OID in the received packet of an SNMP request.

<Step S220>

The standby response control unit 200 functions as the power supply control unit 204 and performs the shift-to-normal-mode process.

The standby response control unit 200 causes the controller 10 to return to the normal mode and generate response data 132 in correspondence to the received packet.

This shift-to-normal-mode process will be described later.

This completes the standby-mode process in this embodiment.

Figure 11:
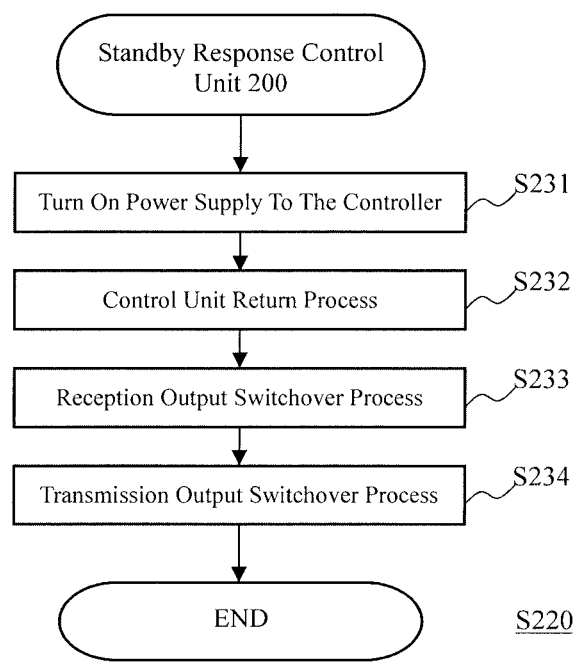
FIG. 11 is a flowchart of shift-to-normal-mode process in the flowchart in FIG. 8.

Next, the shift-to-normal-mode process in step S218 in FIG. 8 will be described with reference to FIG. 11.

<Step S231>

First, the standby response control unit 200 performs the power-on process.

In this process, the standby response control unit 200 causes the power supply control unit 204 to turn on the power supply to the controller 10.

<Step S232>

Next, the standby response control unit 200 performs the control unit return process.

In this process, the standby response control unit 200 resets the control unit 100 and performs other process.

Then, when the control unit 100 accesses the storage unit 130, the self-refresh state is released.

Figure 7:
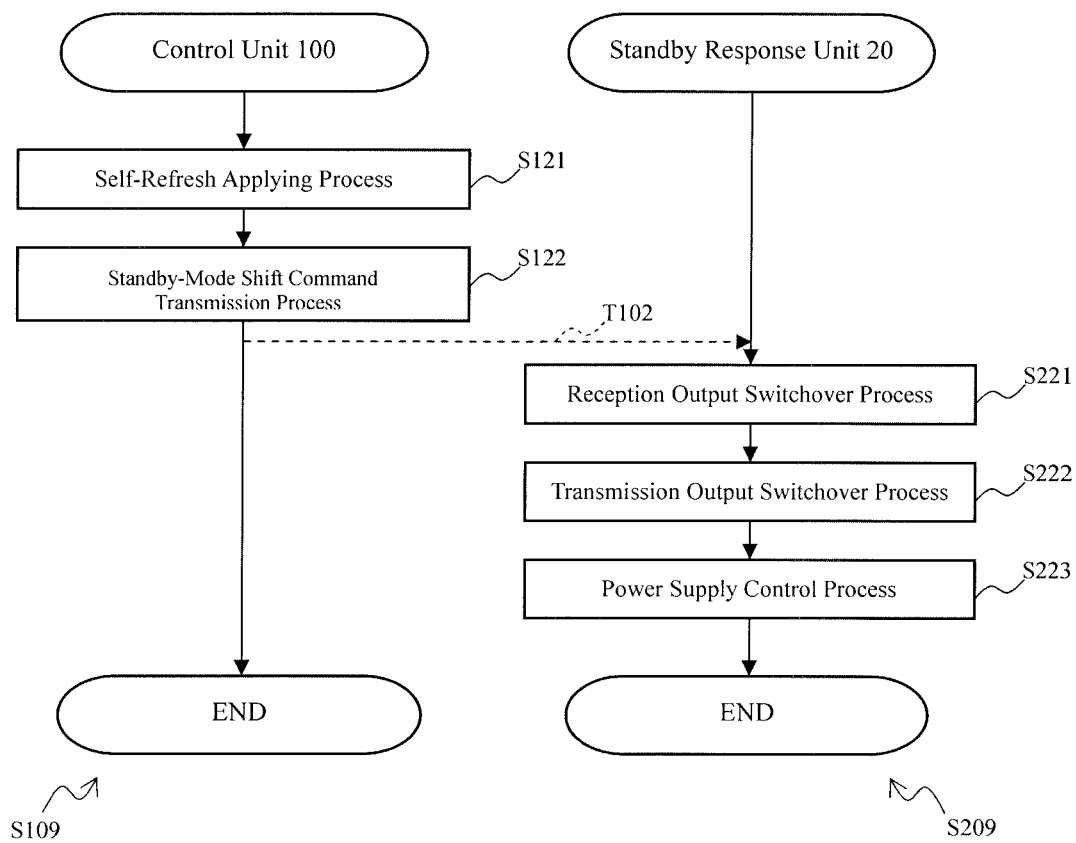
FIG. 7 is a flowchart of shift-to-standby-mode process and standby-mode standby response start process in the flowchart in FIG. 4.

The control unit 100 writes again, to the RAM or the like in the storage unit, various states and the like that have been stored in the HDD or another recording medium in S121 in FIG. 7

<Step S233>

Next, the standby response control unit 200 performs the reception output switchover process.

In this process, the standby response control unit 200 switches the destination of an output produced by the standby response input unit 210 from the standby-mode response data generating unit 201 to the controller input unit 110 in the controller 10.

In this case, the standby response control unit 200 transmits the packet received at the standby response input unit 210 to the controller input unit 110. After a shift to the normal mode, the control unit 100 performs reception process on the packet for which a response failed to be generated in step S101 in FIG. 4 and performs the subsequent response process.

<Step S234>

Next, the standby response control unit 200 performs the transmission output switchover process.

In this process, the standby response control unit 200 switches the destination of an output produced by the standby response output unit 220 from both the transmitting unit 320 in the communication interface unit 30 and the information storing unit 203 in the standby response control unit 200 to the transmitting unit 320 or information storing unit 203.

This completes the shift-to-normal-mode process.

When the image forming apparatus 1 is configured as described above, the following effects are obtained.

The technology described in Patent Document 1 has been problematic in that a shift from the normal mode to the standby mode takes time.

However, the image forming apparatus 1 in an embodiment of the present disclosure may receive information requesting data 131 from the network during both the normal mode and standby mode and may transmit response data 132 to the network 5 in response to the information requesting data 131. The image forming apparatus 1 includes a normal-mode response data generating unit 101 that generates response data 132 during the normal mode, a information storing unit 203 that stores information about the response data 132, which has been generated by the normal-mode response data generating unit 101 during the normal mode, in the storage unit 230, which may be read during the standby mode, as address information 231 and SNMP response information 232, a standby-mode response data generating unit 201 that, during the standby mode, generates response data 132 from address information 231 and SNMP response information 232 that have been stored in the storage unit 230 by the information storing unit 203 and stores the response frequency of the address information 231 or SNMP response information 232, and an stored response data deleting unit 205 that deletes, if the amount of information about the response data 132 stored by the information storing unit 203 exceeds the storage capacity of the storage unit 230, OID-associated data with a response frequency lower than a specified threshold from the SNMP response information 232 during the normal mode.

When the image forming apparatus 1 is configured in this way, information from which response data 132 is generated during the standby mode is stored during the normal mode, so response data 132 may be generated from the stored information without having to transfer the information stored during the standby mode. That is, during the normal mode, information from which response data 132 is generated during the standby mode may be stored in the storage unit 230. Therefore, there is no longer the need to transfer data from the controller 10 to the standby response unit 20 each time a shift from the normal mode to the standby mode is made, so the normal mode may be switched to the standby mode faster than before.

Since OID-associated response data 132 with a low response frequency in the SNMP response information 232, which is used to make a response during the standby mode, is deleted, only OID-associated data with a high response frequency is retained in the storage unit 230. Therefore, it is possible to prevent a situation in which since a response to an SNMP request cannot be generated during the standby mode and the standby mode is thereby switched back to the normal mode, so power consumption cannot be reduced.

In the image forming apparatus 1 in an embodiment of the present disclosure, during the normal mode, the standby response unit 20 acquires its own transmission packet and extracts and stores information necessary to generate a response during the standby mode, and during standby mode, the standby response unit 20 generates a network response from stored information. That is, in normal times, the standby response unit 20 in the image forming apparatus 1 transmits a packet received from the communication interface unit 30 to the controller 10 and also transmits a packet transmitted from the controller 10 to the communication interface unit 30. In these transmissions, the standby response unit 20 checks the packet to be transmitted and stores information necessary to generate a response during the standby mode.

This eliminates the need to set a special response for the standby response unit 20, so a reduction in man-hours to develop the controller 10 may be expected.

In the image forming apparatus 1 in an embodiment of the present disclosure, if the standby-mode response data generating unit 201 fails to generate response data 132 in response to information about information requesting data 131 during the standby mode, the standby-mode response data generating unit 201 stores information about the information requesting data 131 in the storage unit 230 as the non-generated response data information 233. The information storing unit 203 preferentially stores, as the address information 231 and SNMP response information 232, information about response data 132 generated by the normal-mode response data generating unit 101 in correspondence to the information about the information requesting data 131 for which response data 132 failed to be generated over information about the response data 132 with a low response frequency.

When the image forming apparatus 1 is configured as described above, the OID in the SNMP request at a return to the normal mode is stored in the non-generated response data information 233 and the controller 10 is switched back to the normal mode, after which the response data 132 generated by the controller 10 is acquired and the OID for which a response failed to be generated and the response data 132 corresponding to the OID are stored and stored in the SNMP response information 232. Accordingly, data, used to generate a response during the standby mode, with a high response frequency is retained in the storage unit 230 as response data, so a frequency at which the controller 10 is returned from the standby mode to the normal mode because of the inability to respond may be reduced, making it possible to increase low-power efficiency.

With the image forming apparatus 1 in an embodiment of the present disclosure, the information requesting data 131 is request data in ARP or SNMP, and the response data 132 is response data in ARP or SNMP.

Therefore, it is possible to store main information that needs a response from a network during the standby mode, so low-power efficiency may be increased.

In the image forming apparatus 1 in this embodiment, when the standby response unit 20 recursively transmits a packet to the controller 10, response data 132 in the standby mode may be collected.

Therefore, data used to respond on standby is automatically stored in the standby response unit 20, and response data 132 in the standby mode may be generated in a short time. This may increase the possibility that after a shift to the standby mode, necessary response data 132 is generated from SNMP response information 232. Therefore, it is possible to reduce the possibility that response data 132 cannot be generated after a first shift from the normal mode to the standby mode and the controller 10 must thereby be returned to the normal mode, so a reduction in power consumption may be expected.

Embodiments of the present disclosure have been described with an example in which one terminal 2 with an SNMP manger or the like installed is connected to the network 5. As illustrated in FIG. 1, however, a plurality of terminals 2 may be connected to the network 5, and the image forming apparatus 1 may receive packets of information requesting data 131 from these terminals 2.

Embodiments of the present disclosure have also been described with an example in which information stored by the information storing unit 203 is used to generate response data 132 in response to an ARP request or an SNMP request. However, this is not a limitation; various types of information may be stored if the information is data that may be returned as a response in response to an information request.

When the image forming apparatus 1 is configured as described above, a response other than for an ARP request and an SNMP request may also be generated.

In an example in an embodiment described above, information requesting data 131 output from the communication interface unit 30 has been input to the controller 10 via the standby response unit 20 during the normal mode. However, the information requesting data 131 output from the communication interface unit 30 may be input directly to the controller 10 without passing via the standby response unit 20.

When the image forming apparatus 1 is configured as described above, processing load on the standby response unit 20 during the normal mode may be reduced and costs may thereby be reduced.

In embodiments described above, the storage unit 130 and storage unit 230 have had different configurations. However, the storage unit 130 and storage unit 230 may be configured so as to share the same storage medium and the same RAM. In this case as well, the control unit 100 and standby response control unit 200 may exclusively access different memory spaces.

When the image forming apparatus 1 is configured as described above, its cost may be reduced.

In embodiments described above, data corresponding to OIDs in the SNMP response information 232 have been deleted only when there is no free space in the storage unit 230.

However, the value of the response frequency of the data corresponding to each OID in the SNMP response information 232, for example, may be reduced each time a specified period elapses, and if the value of a frequency falls to or below, for example, 0, its corresponding OID and data may be deleted.

When the image forming apparatus 1 is configured as described above, the free area in the storage unit 230 may be increased and the cost of the storage unit 230 may be reduced.

The present disclosure may also be applied to information processing apparatuses other than image forming apparatuses. For example, a server may be used to which a network scanner or a scanner is connected separately via a Universal Serial Bus (USB) cable or the like.

The present disclosure is preferable for an image forming apparatus. However, the present disclosure is not limited to an image forming apparatus; the present disclosure may also be applied to general apparatuses that may operate in a standby mode in which response data 132 is transmitted.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus connected to a network comprising:
    a controller serving as a first central processing unit (CPU);
    a standby response unit serving as a second CPU; and
    an interface unit serving as a first circuit that receives information requesting data via the network and transmits response data to the network in response to the information requesting data during a normal mode and a standby mode,
    wherein the controller includes:
    a storage unit serving as one of a ROM, a RAM, a flash memory, and an HDD, which stores the response data being read out during the standby mode; and
    a normal-mode response data generating unit serving as a second circuit that generates the response data during the normal mode,
    wherein the standby response unit includes:
    an information storing unit serving as a third circuit that, during the normal mode, stores, in the storage unit, information about the response data generated by the normal-mode response data generating unit;
    a standby-mode response data generating unit serving as a fourth circuit that, during the standby mode, generates the response data from the information about the response data, and stores a response frequency of the information about the response data; and
    a stored response data deleting unit serving as a fifth circuit that deletes, if an amount of the information about the response data exceeds a storage capacity of the storage unit, the information about the response data with the response frequency that is lower than a specified threshold,
    wherein, during the standby mode, the standby-mode response data generating unit stores, in the storage unit, information about the information requesting data for which the response data failed to be generated, and
    wherein the information storing unit stores the information about the response data generated by the normal-mode response data generating unit corresponding to the information about the information requesting data for which the response data failed to be generated over the information about the response data with the response frequency that is low.

2. The image forming apparatus according to claim 1, wherein:
    the information requesting data includes data in a request in ARP and SNMP; and
    the response data includes data in a response in ARP and SNMP.

3. A response method by an image forming apparatus including a controller serving as a first central processing unit (CPU), a standby response unit serving as a second CPU, and an interface unit serving as a circuit, the response method comprising:
    via the interface unit serving as the circuit:
    receiving information requesting data from a network during a normal mode and a standby mode; and
    transmitting response data to the network in response to the information requesting data,
    via the controller serving as the first CPU:
    generating the response data in the normal mode, and
    via the standby response unit serving as the second CPU:

storing, during the normal mode, information about the response data generated during the normal mode, in a storage unit serving as one of a ROM, a RAM, a flash memory, and an HDD included in the controller;

generating, during the standby mode, the response data from the information about the response data;

storing, during the standby mode, a response frequency of the information about the response data;

deleting, during the normal mode, if an amount of the information about the response data exceeds a storage capacity of the storage unit, the information about the response data with the response frequency that is lower than a specified threshold;

during the standby mode, storing the information about the information requesting data for which the response data failed to be generated; and storing the information about the response data generated during the normal mode corresponding to the information about the information requesting data for which the response data failed to be generated over the information about the response data with the response frequency that is low.

4. The response method according to claim 3, wherein:
the information requesting data includes data in a request in ARP and SNMP; and
the response data includes data in a response in ARP and SNMP.

5. A non-transitory computer readable recording medium including a program that causes an image forming apparatus connected to a network to function as:
an interface unit that receives information requesting data via the network and transmits response data to the network in response to the information requesting data during a normal mode and a standby mode;
a storage unit that stores the response data being read out during the standby mode;
a normal-mode response data generating unit that generates the response data during the normal mode;
an information storing unit that, during the normal mode, stores, in the storage unit, information about the response data generated by the normal-mode response data generating unit;
a standby-mode response data generating unit that, during the standby mode, generates the response data from the information about the response data, and stores a response frequency of the information about the response data; and
a stored response data deleting unit that deletes, if an amount of the information about the response data exceeds a storage capacity of the storage unit, the information about the response data with the response frequency that is lower than a specified threshold,
wherein, during the standby mode, the standby-mode response data generating unit stores, in the storage unit, information about the information requesting data for which the response data failed to be generated, and
wherein the information storing unit stores the information about the response data generated by the normal-mode response data generating unit corresponding to the information about the information requesting data for which the response data failed to be generated over the information about the response data with the response frequency that is low.

6. The non-transitory computer readable recording medium according to claim 5, wherein:
the information requesting data includes data in a request in ARP and SNMP; and
the response data includes data in a response in ARP and SNMP.

* * * * *